United States Patent
Wang et al.

(10) Patent No.: US 6,896,236 B2
(45) Date of Patent: May 24, 2005

(54) CONTROLLED LEAKAGE HYDRAULIC DAMPER

(75) Inventors: Yan Wang, Ann Arbor, MI (US); Thomas William Megli, Dearborn, MI (US); Philip Thomas Koneda, Novi, MI (US); Stephen John Agdorny, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 140 days.

(21) Appl. No.: 10/250,064

(22) Filed: Jun. 2, 2003

(65) Prior Publication Data

US 2004/0238773 A1 Dec. 2, 2004

(51) Int. Cl.[7] .................................................. F01L 9/02
(52) U.S. Cl. ..................... 251/30.01; 251/62; 251/63; 251/63.5; 251/63.6; 251/129.1; 251/129.18; 251/48; 123/90.11; 123/90.12
(58) Field of Search .................... 251/129.09, 129.1, 251/129.15, 129.18, 63.4–63.6, 14, 22, 48, 62, 50–55, 63, 30.01; 123/90.11, 90.12, 90.13

(56) References Cited

U.S. PATENT DOCUMENTS

| | | | | |
|---|---|---|---|---|
| 2,207,921 A | * | 7/1940 | Huxford | 137/486 |
| 2,439,523 A | * | 4/1948 | Miller et al. | 251/30.02 |
| 2,526,972 A | * | 10/1950 | Ray | 137/80 |
| 3,887,019 A | | 6/1975 | Reynolds et al. | |
| 4,883,025 A | | 11/1989 | Richeson, Jr. | |
| 5,809,950 A | * | 9/1998 | Letsche et al. | 123/90.12 |
| 5,832,883 A | | 11/1998 | Bae | |
| 6,076,490 A | | 6/2000 | Esch et al. | |
| 6,116,570 A | | 9/2000 | Ulgatz et al. | |
| 6,205,964 B1 | | 3/2001 | Maisch et al. | |
| 2002/0108591 A1 | * | 8/2002 | Lou | 123/90.12 |

* cited by examiner

Primary Examiner—J. Casimer Jacyna

(57) ABSTRACT

A hydraulic damper cylinder 270 is provided for an electromagnetic actuated internal combustion engine cylinder valve 20. The damper includes a piston 68 slidably mounted within the damper cylinder 270. The piston 68 bifurcates the cylinder 270 into a first control volume 74 and a second control volume 76. The first and second control volumes are fluidly connected by an inboard flow path 372. Along the extreme ends of travel, the flow path 372 is blocked by the piston 68 and damping occurs through fluid transfer through an outboard flow path 374.

8 Claims, 5 Drawing Sheets

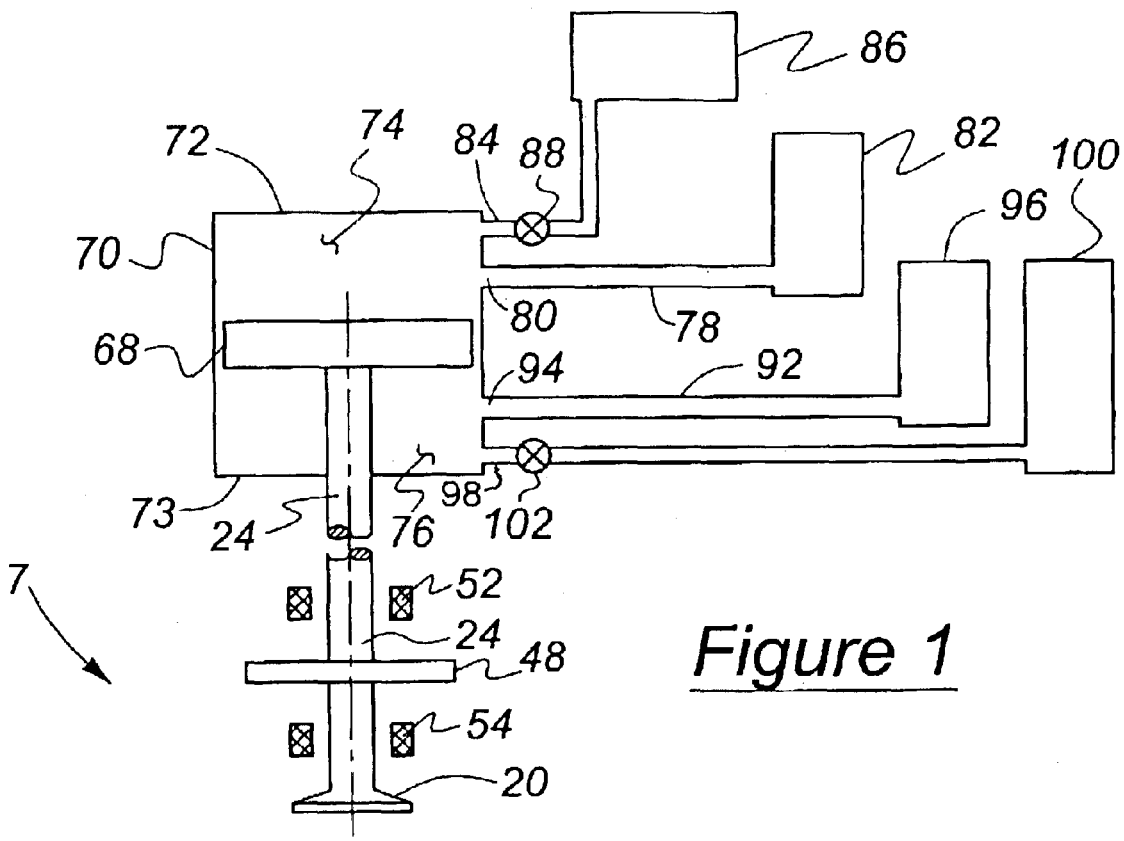
*Figure 1*
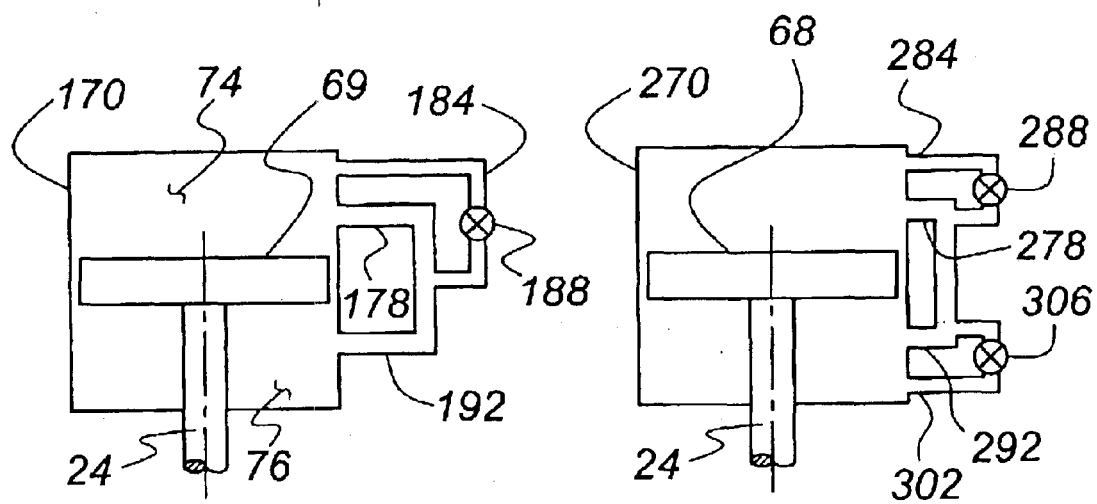
*Figure 2*  *Figure 3*

US 6,896,236 B2

CONTROLLED LEAKAGE HYDRAULIC DAMPER

BACKGROUND OF INVENTION

The present invention relates to a hydraulic damper for an electromechanical valve utilized in a reciprocating piston internal combustion engine. In particular the present invention relates to a hydraulic damper that can provide relatively soft seating of an engine valve on an engine valve seat.

With a conventional mechanical engine valve-train system, the profile of the cam controls the valve to have seating velocity in a range that ensures soft seating at low engine speeds while maintaining reasonably fast closing and opening rates for good high speed volumetric efficiency. This range is typically designed using a 15–18 Î¼ m/degree cam ramp over the expected range of valve lash. The valve seating velocity (m/s) in a camshaft driven valve system is then proportional to the engine speed (rpm).

One of the significant challenges with electromechanical valve actuation systems is to replicate this engine speed dependant "soft seating" feature repeatably over all operating conditions and at low cost. Hydraulic damping has been identified as an effective approach to reduce the valve and armature impact velocity for electro-mechanically actuated valve trains. However, the damping does not provide engine speed dependant seating velocity. Additionally, the damper performance changes with oil temperature.

It is desirable to provide an apparatus and method of utilization thereof wherein a variable valve seating velocity can be achieved in a mechanical valve for different oil temperatures and engine speeds by varying the damper leakage flow area.

SUMMARY OF INVENTION

In a preferred embodiment, the present invention provides an electromagnetic internal combustion engine cylinder valve actuator having a hydraulic damper including a damper cylinder. The damper cylinder mounts a piston that splits the damper cylinder into two control volumes or chambers. The two chambers are filled with low pressure engine oil. The piston is attached to an armature assembly of a linear electromagnetic valve actuator.

A damping force will be generated by the pressure difference between the two chambers. The force is exerted on the piston and transmitted to the armature/valve. The damping force is determined by the flow from one chamber to the other, through a flow path between the two chambers. When the piston approaches its extreme positions, the inboard flow path between the two chambers will be blocked and the flow can only go through a so-called outboard flow or leakage path, which consequently controls the terminal damping force. The terminal damping force determines piston terminal velocity and therefore, the armature/valve seating velocity. The relation of flow, damping force, and terminal velocity will be shown later in this document. A desired variable terminal velocity can be obtained if the leakage flow is controllable.

It is an advantage of the present invention to provide a hydraulic damper which provides very low valve speeds towards an extreme end of the valve's movement.

Other advantages of the present invention will become more apparent to those skilled in the art as the invention is further revealed in the accompanying drawings and detailed description.

BRIEF DESCRIPTION OF DRAWINGS

FIG. 1 is a schematic view of a preferred embodiment of the present invention.

FIGS. 2–3 are schematic views of alternate preferred embodiments of the present invention.

DETAILED DESCRIPTION

Figure 4:
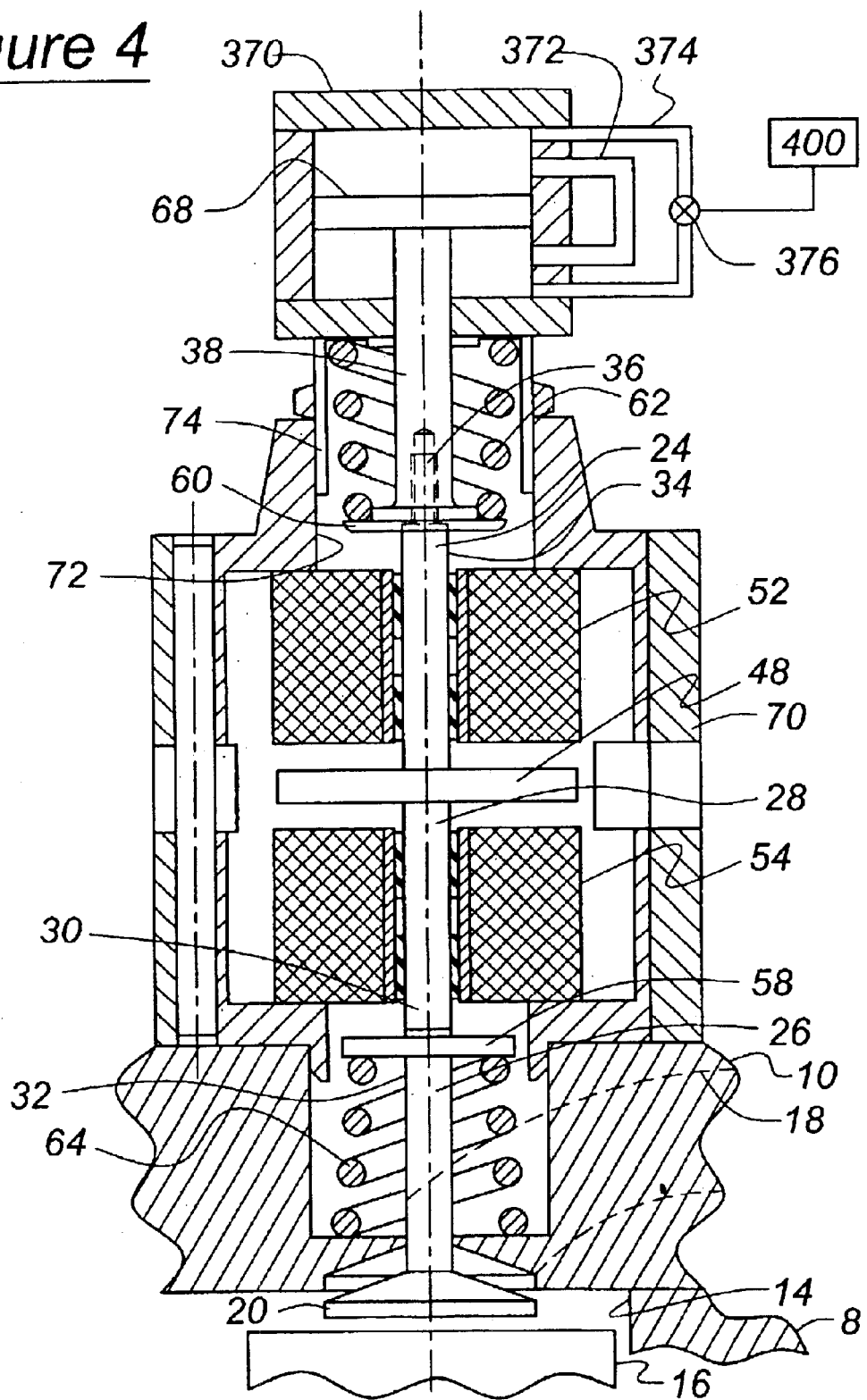
FIG. 4 is a sectional view of another embodiment of the present invention.

FIG. 1 shows an electromechanical valve for an internal combustion engine with a damper according to the present invention. The electromechanical valve 7 has a poppet valve body 20. Connected with the poppet valve body 20 is an armature 48. The armature is typically ferro-magnetic and can be attracted by a first coil 52 to close the valve or, alternatively, by a second coil 54 to open the valve. The valve body 20 is connected with a damper piston stem 24. The stem 24 is operatively associated with a damper piston 68. The damper piston 68 is slidably mounted within a damper cylinder 70. The damper cylinder 70 has an upper end 72 and a lower end 73.

The piston 68 bifurcates the cylinder 70 into a first chamber or control volume 74 and a second chamber or control volume 76. The first control volume 74 is exposed to the first end 72 of the damper cylinder 70, and the second control volume 76 is exposed to the second end 73 of the damper cylinder 70. A first inboard flow path 78 intersects the cylinder 70 at a first location 80. The first inboard flow path 78 fluidly connects the first control volume 74 with a third control volume 82.

The third control volume 82 may be a rigid control volume for a specific electromechanical valve 7 or may be a combined control volume for a plurality of electromechanical valves for a given engine. The third control volume 82 may be a fixed volume or a volume which is exposed to an accumulator (not shown). It is preferable that the third control volume be of relatively low pressure via an accumulator or other exit flow path which connects it to a low pressure sump.

The damper cylinder 70 is also provided a first outboard flow path 84. The first outboard flow path 84 fluidly connects the first control volume 74 with a fourth control volume 86. The first outboard flow path 84 is substantially flow restricted with respect to the first inboard flow path 78. A connection of the first outboard flow path 84 with the fourth control volume 86 is independent of any restriction of the first inboard flow path 78 by a positioning of the piston 68 adjacent to the first location 80. Placed within the first outboard flow path 84 is a variable restrictive valve 88.

A second inboard flow path 92 intersects the cylinder 70 at a second location 94. In a similar manner as previously described in regards to the first inboard flow path 78, the second inboard flow path 92 fluidly connects the second control volume 76 with a fifth control volume 96. The fifth control volume 96 is similar or identical to the third control volume 82. Also fluidly connected with the second control volume 76 is a second outboard flow path 98. The second outboard flow path 98 fluidly connects the second control volume 76 with a sixth control volume 100 via a variable restrictive valve 102.

The first and second control volumes 74 and 76 are both filled with low pressure oil, preferably the lubrication oil of the engine. A damping force is generated by the pressure differential between the first and second control volumes 74 and 76. As shown, the first control volume 74 acts upon a larger piston area than the second control volume 76. If desired, the stem 24 can be sealably extended beyond upper end 72 to eliminate any piston area imbalances.

In an example when the valve body 20 is being closed, the coils 52 of the electromechanical valve will be activated to attract the armature 48 in an upward direction, accordingly, moving piston 68 in an upward direction. As piston 68 moves up, fluid will be delivered from the first control volume 74 into primarily the third control volume 82, and from the fifth control volume 96 into the second control volume 76. As the piston approaches the first location 80, the flow to the third control volume will be restricted.

Thereafter, damping force on the piston will be greatly enhanced, since the first outboard flow path 84 is materially flow restricted with respect to the first inboard flow path 78. The terminal damping force will determine the piston 68 terminal velocity. Accordingly, the terminal velocity of the piston 68 can be controlled by utilization of the variable restrictive valve 88 placed in the first outboard flow path 84.

In the present invention, feed-forward control is used to achieve the desired seating velocity. It will also improve the system performance for different oil temperatures. Because of the slow variation of both the engine speed and oil temperature, the control of the leakage area can be updated every cycle, which is a slow process compared to the valve transition. Position feedback controllers, which control the armature/valve motion by carefully controlling the current to the electromagnets, require high speed sensors and intensive computing power to achieve loop times that are small compared to the valve transition time. The control of the flow area is a much easier task, and moreover, it does not require high speed microprocessors. Therefore, the current invention not only maintains the low cost and robustness properties of the hydraulic damper, but it also improves the damper performance by including variable contact velocity.

From the closed position, damping in the downward direction will mainly be a function of pressure in the second control volume 76. After the piston 68 has closed off the second inboard flow path 92, pressure within the second control volume will materially increase. Damping force and hence terminal velocity in piston 68 will therefore be controlled by the function of the second flow restrictive valve 102.

FIG. 2 is an alternate preferred embodiment of the damper portion of the electromechanical valve shown in FIG. 1. In FIG. 2, a first inboard flow path 178 fluidly connects the first control volume 74 with a third control volume 82 which is coterminous with the second control volume 76 due to the loop connection with the second inboard flow path 192.

A first outboard flow path 184 fluidly connects the first control volume 74 with a fourth control volume, which is also coterminous with the second control volume 76. The first outboard flow path 184 has a variable restrictive valve 188 which functions in the manner generally aforedescribed in relationship to the restrictive valve 88. The design of FIG. 2 provides a low cost design, in that only one restrictive valve 188 is required. In certain applications, it is most important to control damping on the closure of the valve body 20, and the opening parameters of the valve body 20 are not as restrictive.

The piston 69 in the damper of the electromechanical valve in FIG. 2 has a designed clearance with the cylindrical walls of the cylinder 170. This clearance allows the piston 69 to have its damping upon opening set about by the parameters of the controlled leakage past the piston 69 even when the piston restricts or shuts off the second inboard flow path 192.

Referring to FIG. 3, a damper cylinder 270 is provided, which has first and second inboard flow paths 278 and 292 essentially similar to those aforedescribed in FIG. 2. The damper cylinder 270 has first and second outboard flow paths 284 and 302. The first outboard flow path 284 has in place within it a variable restrictive valve 288. The second outboard flow path 302 has a variable restrictive valve 306. Valves 288 and 306 can be independently set to allow the opening and closing velocity of the valve body 20 to be set independently.

FIG. 4 shows a front elevational view of another preferred embodiment electromechanical valve with a damper according to the present invention placed in the environment of an automotive vehicle internal combustion engine 7. The internal combustion engine 7 has a body provided by an engine block 8 and cylinder head 10. The engine body is typically fabricated from cast iron or aluminum. The engine body typically has a plurality of cylinders 14 formed therein. Mounted for reciprocal motion within the cylinder 14 is a piston 16. The cylinder head 10 has an air passageway 18 which intersects the cylinder 14.

The poppet valve body 20 is provided for controlling fluid communication through the passageway 18 into the cylinder 14. The valve body 20 is connected with the multiple-part stem 24. The stem 24 has a lower portion 26. Separated from the lower portion 26 is a mid-portion 28. The stem midportion 28 has a lower end 30 which is gapped away from an upper end 32 of the lower portion 26. This gap between the lower end 30 and upper end 32 provides lash clearance.

Fixably connected to the mid-portion 28 is an upper mid-portion 34. The upper mid-portion 34 has a head 36 which is fixably connected within a damper portion 38 of the stem. A threaded connection is shown, however other types of connections are not excluded.

Connected on the stem 24 between the lower portion 26 and mid-portion 28 is an armature 48. Surrounding the stem 24 above the armature 48 is a first electromagnetic coil 52. The first coil 52 when activated urges the armature 48 in an upper first direction. Juxtaposed from the first coil by the armature 48 is a second electromagnetic coil 54. The second coil 54 urges the armature in a second downward direction opposite the direction of urging by the upper coil 52. The stem lower portion 26 has fixably connected thereto a spring retainer 58. The lower damper portion of the stem has an integral spring retainer 60. A first coil spring 62 contacts the spring retainer 60 to urge the stem 24 in the second downward direction. A second spring 64 exerts itself against the spring retainer 58 to exert the stem 24 in a respective upper first direction.

Referring still to FIG. 4, a damper cylinder 370 is provided. The damper cylinder 370 has a simplified looped first and second inboard flow path 372 and a combined outboard flow path 374 with a variable restrictive control valve 376 placed therein. The embodiment of the present invention shown in FIG. 4 in most cases will be preferable due to its simplicity and functionality.

Figure 7:
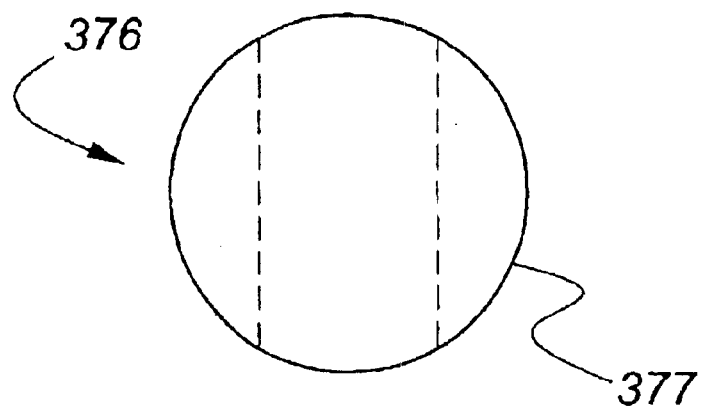
FIG. 7 is a top elevational view of a barrel utilized in a restrictive valve shown schematically in FIG. 4.
Figure 8:
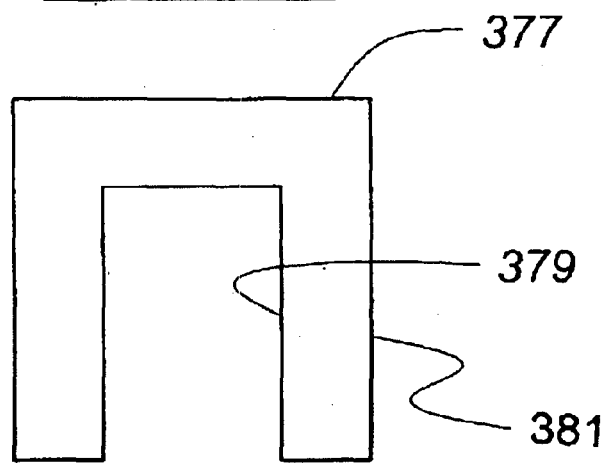
FIG. 8 is a front elevational view of the barrel shown in FIG. 7.
Figure 9:
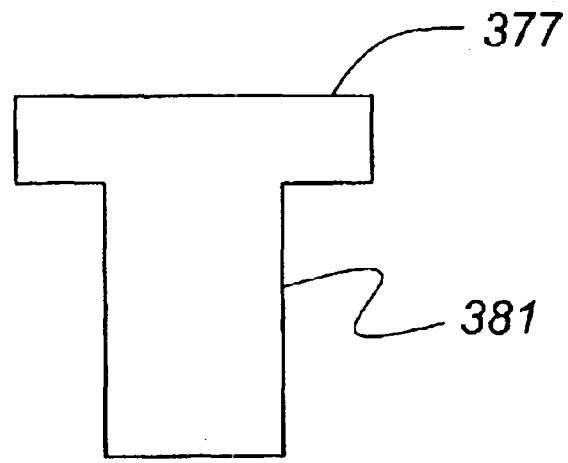
FIG. 9 is a side elevational view of the barrel shown in FIG. 7.

FIGS. 7–9 also show a simple barrel variable restrictive valve 376 to control the leakage flow (not shown). The valve 376 has a rotary barrel 377 with a pass through opening 379. The maximum flow area is available in the state shown in FIG. 8. A stepper motor (not shown) may be used to control the angle of the barrel 377 relative to a housing with aligned hydraulic fittings (not shown). The flow through the valve will be dependent on the angle of the barrel 377. The flow area may be set to a minimum by closing the valve aligning walls 381 with the housing fittings. Here maximum damping is achieved and is dependent on the clearance area between the damper barrel wall 381 and housing cylindrical wall.

Based on both theoretical expression shown later and experiments, the dependent relation of angle to both the engine operational parameters of oil temperature, and engine speed may be derived and stored as a map in a controller 400 for a feed-forward contact velocity valve 20 control scheme (FIG. 4). The controller 400 may be part of the engine controller. For example, when the oil temperature is low and engine speed is high, a big leakage area is desired; when the oil temperature is low and engine speed is also low, a moderate leakage area is desired; when the oil temperature is high and engine speed is low, a small leakage area is desired, when the oil temperature is high and engine speed is high, a moderate leakage area maybe be desired. The controller map can also consider angle adjustments dependent upon engine load.

It is noted that this mechanism is capable of achieving "continuous" variable flow area with a preset range. It is apparent to those skilled in the art that a multi-positional spool valve can be utilized instead of barrel valve 377.

Figure 10:
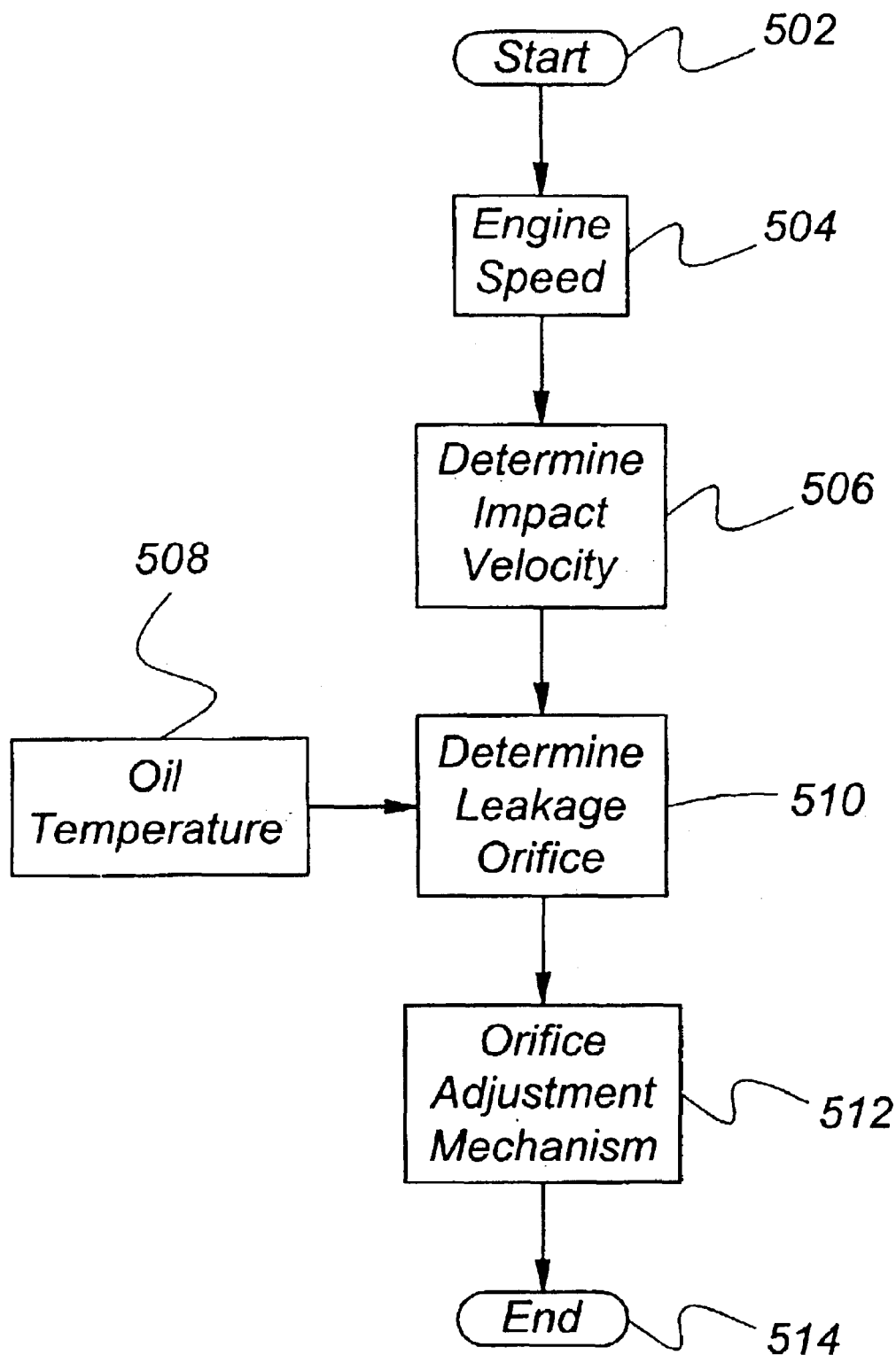
FIG. 10 is a flow chart illustrating the possible algorithm utilized to control a restrictive valve shown in FIG. 4.

Referring to FIG. 10, as the engine is started, a sensor (not shown) informs the controller of the engine speed 504. The controller determines the desired impact velocity 506 for the valve 20. Another sensor (not shown) determines the engine oil temperature 508. From the determination of the oil temperature, desired impact velocity and engine speed, a determination is made of the amount of leakage desired by the valve 376 in step 510. After a determination is made of the desired leakage, the valve 376 is adjusted in step 512. As the valve 20 completes its extreme travel event, the algorithm is ended in step 514 and the algorithm is restarted in step 502.

It is apparent to those skilled in the art that other steps may be added as a determination of engine loading which will feed into the determination of leakage in step 510.

DETAILED THEORY OF THE OPERATION

A simple form of the relationship between magnetic $F_{mag}$, spring force $K_S L$, and damping force $F_{damp}$ is provided as: $F_{mag} - K_S L = F_{damp}(v)$ (1) where the damping force is a function of the damper and armature velocity v that is roughly constant at the end of a transition.

The damping force is calculated by the product of the pressure differential $\Delta P$ of the two control volume chambers across the damping piston and the piston area $A_{piston}$. The pressure drop $\Delta P$ and the armature velocity v are both related to the flow Q from one chamber to the other in the damper, $$Q = v A_{piston} = C_d A_{orifice} \sqrt{\frac{2(\Delta P)}{\rho}} \quad (2)$$

where, $C_d$ is the flow coefficient, $A_{orifice}$ is the flow orifice area, which is the leakage area at the end of the transition, and $\rho$ is the density. The damping force as a function of velocity v is then:

$$F_{damp} = A_{piston} \Delta P = \frac{\rho}{2}\left(\frac{v A_{piston}}{C_d A_{orif}}\right)^2 A_{pist} = \frac{A_{piston}^3 \rho}{2 C_d^2 A_{orifice}^2} v^2 \quad (3)$$

Following the method outlined by Herbert E. Merritt in Hydraulic Control Systems, the discharge coefficient is given by:

$$C_d = \frac{C_{dmax}\sqrt{Re}}{\sqrt{Re_t}} \quad \text{for } Re < Re_t$$

and $$C_d = C_{d\ max} \text{ for } Re > Re_t \quad (4)$$

Typical values for maximum discharge coefficient and transitions Reynolds number are $C_{dmax}=0.61$ and $Re_t=25$. Note that Re is the orifice Reynolds number, which can be written in terms of oil density $\rho$, viscosity $\mu$, and orifice diameters $D_{orifice}$ as:

$$\text{as: } Re = \frac{\rho v D_{orifice}}{\mu} \quad (5)$$

It is also known that the oil viscosity $\mu$ is temperature dependent, $$\mu = A e^{\frac{E_v}{kT}} \quad (6)$$

where, A and Ev (known as the activation energy for viscous flow) are constants, k is the Boltzmann's constant, and T is the oil temperature.

Substituting Equations (3–6) into Equation (1) gives the approximate terminal velocity V, $$v = \begin{cases} \sqrt{\dfrac{2(F_{mag} - K_s L)C_{dmax}^2 D_{orifice} A_{orifice}^2}{A_{piston}^3 Re_t A e^{\frac{E_v}{kT}}}} & \text{when } Re < Re_t \\ \sqrt{\dfrac{2(F_{mag} - K_s L)C_{dmax}^2 A_{orifice}^2}{A_{piston}^3}} & \text{when } Re > Re_t \end{cases} \quad (7)$$

Equation (7) shows the relation between the terminal velocity v and orifice area and oil temperature. For the case when $Re<Re_t$, it is obvious that controlling the orifice area will change the terminal velocity v and it can help compensate the effect of oil temperature T on v. However, this compensation does not work when $Re>Re_t$, which happens with large orifice or/and high temperature. Additionally the contact velocity can be scheduled in proportion to the engine speed, and replicate the function of cam ramps in present camshaft valve trains.

CONCEPT VERIFICATION

Figure 5:
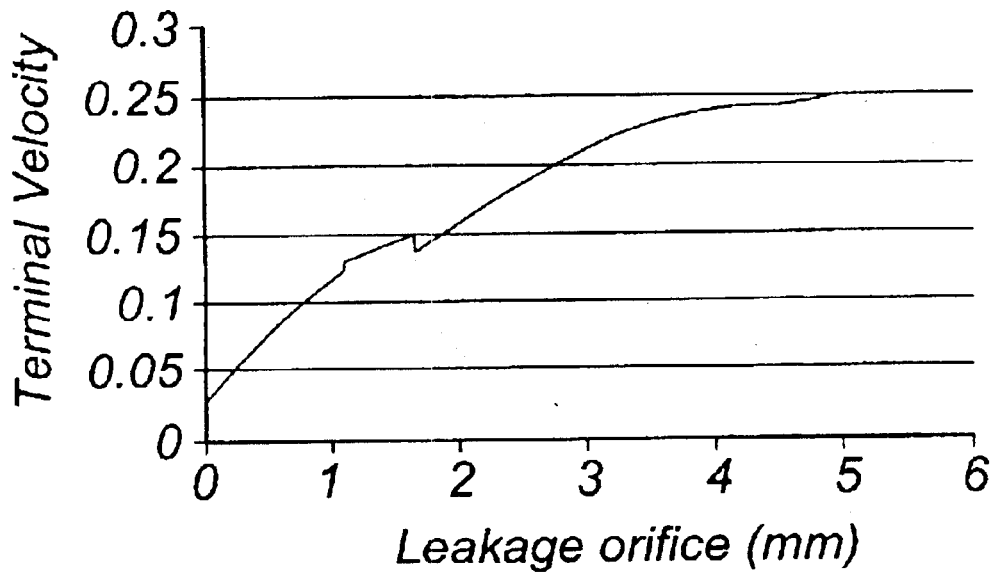
FIG. 5 is a graphic illustration showing the relationship between valve terminal velocity and leakage flow rates.
Figure 6:
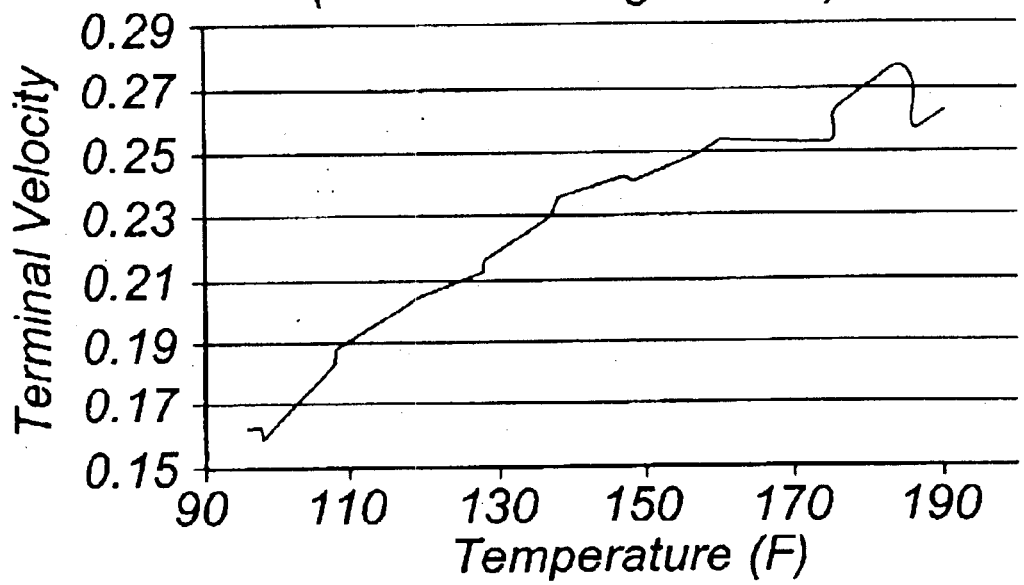
FIG. 6 is a graphic illustration showing the relationship between terminal velocity and engine oil temperature.

The relation shown in Equation (7) was confirmed by a couple of experiments. In the first experiment, the leakage flow area was controlled by a needle valve. By increasing the leakage orifice, the terminal velocity v increases, which is shown in FIG. 5. The next experiment fixed the leakage orifice at about 1.1 mm. Then the supply oil was heated and the terminal velocity v was observed. The terminal velocity v increases with the temperature as expected, also shown in FIG. 6. The terminal velocity v can change from 0.03 m/s to 0.25 m/s by changing the leakage orifice from zero to 5 mm, which is a big range of variation. This shows the capability of using leakage flow control to achieve the desired terminal velocity v. The temperature effect is not as significant as the orifice size effect. Therefore, the leakage flow control can also be utilized to compensate the temperature variation when the engine starts.

The present invention has been described in various embodiments. It will be apparent to those skilled in the art of the various modifications and changes which can be made to the present invention without departing from the spirit or scope of the invention as it is encompassed by the following claims.

What is claimed is:

1. A hydraulic damper for an electromechanical valve, said electromechanical valve having a valve body operatively associated with a stem, said damper comprising:

a cylinder having first and second ends;

a piston slidably mounted within said cylinder bifurcating said cylinder into first and second control volumes exposed to respective first and second ends of said cylinder, said piston being operatively associated with said stem;

a first inboard flow path intersecting said cylinder at first and second locations for fluidly connecting said first and second control volumes;

a first outboard flow path substantially flow restricted with respect to said inboard flow path; said outboard flow path connecting said first and second control volumes independent of any restriction of said inboard flow path by a positioning of said piston within said cylinder adjacent to said first or second locations.

2. A hydraulic damper for an electromechanical valve as described in claim 1, wherein a variable restrictive valve is placed within said first outboard flow path.

3. A hydraulic damper for an electromechanical valve as described in claim 1, further including a second outboard flow path fluidly connecting said first and second control volumes independent of a positioning of said piston adjacent said first and second locations, said second outboard flow path being substantially flow restricted with respect to said first inboard flow path.

4. A hydraulic damper for an electromechanical valve as described in claim 2, wherein said second outboard flow path has a variable restrictive valve placed therein.

5. A hydraulic damper for an electromechanical valve as described in claim 3, wherein both of said outboard flow paths have variable valves placed therein.

6. An electromechanical valve comprising:

a valve body connected with a valve stem;

an armature connected on said stem;

first and second coils juxtaposed by said armature for urging said armature in first and second respective directions;

first and second springs for urging said stem in said second and first directions respectively;

a cylinder having first and second ends;

a piston slidably mounted within said cylinder bifurcating said cylinder into first and second control volumes exposed to said respective first and second ends of said cylinder, said piston being operatively associated with said stem;

a first inboard flow path intersecting said cylinder at first and second locations for fluidly connecting said first and second control volumes;

an outboard flow path substantially flow restricted with respect to said inboard flow path connecting said first and second control volumes with one another, independent of any restriction of said inboard flow path by a positioning of said piston within said cylinder adjacent to said first or second locations, said outboard flow path having a variable restrictive valve placed therein.

7. An internal combustion engine comprising:

an engine body having a cylindrical cavity with a reciprocating piston mounted therein with a passageway intersecting said cylinder;

a valve body for controlling fluid communication through said passageway with said cylindrical cavity;

a valve stem connected with said valve body;

an armature connected on said stem;

first and second coils juxtaposed by said armature for urging said armature in respective first and second directions;

first and second springs for biasing said armature in said respective second and first directions;

a damper cylinder having first and second ends;

a damper piston slidably mounted within said damper cylinder bifurcating said cylinder into first and second control volumes exposed to said respective first and second ends of said damper cylinder, said damper piston being operatively associated with said stem;

an inboard flow path intersecting said cylinder at first and second locations for fluidly connecting said first and second control volumes;

a first outboard flow path substantially flow restricted with respect to said inboard flow path, said first outboard flow path fluidly connecting said first and second control volumes via a variable restrictive valve independent of any restriction of said first inboard flow path by a positioning of said damper piston within said damper cylinder adjacent said first or second locations.

8. An electromechanical valve as described in claim 7 having a multiple part stem having a first part connected with said valve body and being urged by said second spring to be in contact with a second part of said stem that is connected with said armature.

* * * * *